(12) United States Patent
Olesen

(10) Patent No.: US 6,810,159 B2
(45) Date of Patent: *Oct. 26, 2004

(54) METHOD AND AN APPARATUS FOR MODULATING LIGHT

(75) Inventor: Dennis S. Olesen, Skiby (DK)

(73) Assignee: Tellabs Denmark A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 10/417,027

(22) Filed: Apr. 15, 2003

(65) Prior Publication Data

US 2003/0202727 A1 Oct. 30, 2003

Related U.S. Application Data

(63) Continuation of application No. 10/075,137, filed on Feb. 13, 2002, now Pat. No. 6,556,728, which is a continuation of application No. 09/331,825, filed as application No. PCT/DK97/00590 on Dec. 22, 1997, now Pat. No. 6,374,000.

(30) Foreign Application Priority Data

Dec. 23, 1996 (DK) ............................................. 1501/96

(51) Int. Cl.$^7$ ............................................. G02F 1/035
(52) U.S. Cl. ................... 385/2; 385/4; 385/8
(58) Field of Search ................... 385/1, 2, 4, 8

(56) References Cited

U.S. PATENT DOCUMENTS 5,003,624 A 3/1991 Terbrack et al.
5,161,044 A 11/1992 Nazarathy et al.
5,170,274 A 12/1992 Kuwata et al.
5,317,443 A 5/1994 Nishimoto
5,359,449 A 10/1994 Nishimoto et al.
5,515,199 A 5/1996 Farina
5,742,268 A 4/1998 Noda
6,374,000 B1 * 4/2002 Olesen ........................ 385/2
6,556,728 B2 * 4/2003 Olesen ........................ 385/2

* cited by examiner

*Primary Examiner*—Akm Enayet Ullah
*Assistant Examiner*—Sarah U Song
(74) *Attorney, Agent, or Firm*—Baker Botts L.L.P.

(57) ABSTRACT

The invention relates to a method and a modulator circuit for modulating light in a modulator circuit.

The modulator circuit comprises a Mach-Zehnder modulator having at least one optical input and at least one optical output, said Mach-Zehnder modulator modulating light, which is fed to the input of the Mach-Zehnder modulator in response to applied electrical modulation signals from a driver circuit.

According to a method of the invention, the applied modulation signal on the electrodes of the Mach-Zehnder modulator is superimposed by a pilot tone which is thus superimposed by the modulated light emitted by the Mach-Zehnder modulator. In response to the emitted modulated light, an electrical feedback circuit generates bias control signals for the bias circuit and driver control signals for the driver circuit for regulating the bias signal and the driver signal fed to the Mach-Zehnder modulator.

20 Claims, 3 Drawing Sheets

METHOD AND AN APPARATUS FOR MODULATING LIGHT

RELATED APPLICATIONS

This application is a continuation of U.S. application Ser. No. 10/075,137 filed Feb. 13, 2002, now U.S. Pat. No. 6,556,728 which is a continuation of U.S. application Ser. No. 09/331,825 filed Jun. 23, 1999 now U.S. Pat. No. 6,374,000 which claims the benefit of PCT Application No. PCT/DK97/00590 filed Dec. 22, 1997 from Denmark Application No. 1501/96 filed Dec. 23, 1996.

TECHNICAL FIELD OF THE INVENTION

The present invention relates in general to fiber optic technology and more particularly to a method and apparatus for modulating light.

BACKGROUND OF THE INVENTION

Optical communication involves the need of modulating the optical signals.

This modulation may be performed by direct modulation of the light source, e.g. by direct modulation of a laser diode with data signals, but it is preferred in several connections to perform modulation on the light itself. This type of modulation is called optical modulation.

A problem involved by the direct optical modulation is that the characteristics of the modulator change over time as a function of temperature, changed properties of the material, etc. This change specifically means that the optical output as a function of the electrical driver signals is not constant, which results in undesired distortion of the optical signal.

U.S. Pat. No. 5,170,274 describes an optical transmitter of the Mach-Zehnder type, in which feedback from the modulator is obtained by means of a low-frequency pilot tone superimposed on the electrical driver signal of the modulator, thereby providing some compensation for the drift of the operating point of the modulator. However, this transmitter has the drawback that the extinction ratio is gradually impaired because of amplified drift of the modulated signal, or more particularly a drift with respect to the amplitude of the transmission characteristic of the Mach Zehnder modulator.

SUMMARY OF THE INVENTION

From the foregoing, it may be appreciated by those skilled in the art that a need has arisen for an improved technique for modulating light. In accordance with the present invention, a system and method for modulating light are provided which substantially eliminate or greatly reduce disadvantages and problems associated with conventional modulation techniques.

The photoelectrical converter circuit is connected to and generates a feedback signal for a feedback circuit which is also connected to the pilot tone generator, said feedback circuit being adapted, in response to the pilot tone signal fed from the pilot tone generator and the feedback signal fed from the photoelectrical converter circuit, to generate driver control signals for the driver circuit to regulate the driver signal fed to the Mach-Zehnder modulator, it is possible to achieve a very well-defined regulation of a modulator circuit. Thus, the invention enables regulation, optimum in some cases, of the fed driver signal, i.e. the modulation amplitude, which is fed to the Mach-Zehnder modulator. The regulation may thus be performed automatically in connection with temperature errors or fluctuations.

This may be a particular advantage in connection with e.g. so-called bias-free Mach-Zehnder modulators, where bias corrections should be avoided, since such bias corrections will cause drift in the overall circuitry.

In case of drift or e.g. temperature fluctuations, it is thus possible according to the invention to control the amplitude of the modulation signal.

It should be noted that it is not decisive according to the invention how the modulation signals, formed by the driver signal and the pilot tone, are fed to the Mach-Zehnder modulator. The pilot tone and the driver signal may e.g. may be mixed electrically before the signal is fed to the electrodes of the modulator, and the driver signal and the pilot tone may be fed to separate electrodes or sets of electrodes in the Mach-Zehnder modulator, if desired.

The pilot tone signal is fed to the logic "0" and/or logic "1" of the modulation signal, and the feedback circuit provides driver control signals in response to the pilot tone component of the feedback signal corresponding to the pilot tone signal, a particularly advantageous embodiment of the invention is obtained, as the regulation of the modulation voltage is "tuned" to either the ideal logic "0" or the ideal logic "1". The amplitude regulation of the modulation voltage may thus be adjusted to a desired asymmetric proportion without bias regulation, which is extremely advantageous in several applications, since regulation of the bias/DC operating point per se results in electrode drift.

Regulation of the amplitude thus makes it possible to currently allow for e.g. temperature-caused changes in the transmission characteristic which particularly concern the actual amplitude of the transmission characteristic.

Thus, the regulation according to the invention may thus allow for the undesirability of applying a DC voltage to the Mach-Zehnder modulator, as this DC voltage gives rise to drift in the transmission characteristic.

The driver signal, in response to the pilot tone signal fed to the modulation signal, is regulated to the logic "0" or logic "1" of the modulation signal in according with either $$\Delta V_{amp} \sim F_L \cdot k_1 \text{ or}$$

$$\Delta_{amp} \sim F_H \cdot k_2$$

where $\Delta V_{amp}$ is the change in the driver signal provided by the regulation, $k_1$ and $k_2$ are a suitably selected constant for the algorithm, $F_L$ and $F_H$ assume the value +1 when the pilot tone component at logic "0" and logic "1", respectively, is in in-phase with the corresponding pilot tone generated by the pilot tone generator, and $F_L$ and $F_H$ assume the value −1 when the pilot tone component at logic "0" and logic "1", respectively, is in antiphase with the corresponding pilot tone generated by the pilot tone generator, a very efficient regulation algorithm is achieved according to the invention, as the feedback circuit hooks on to either the logic "0" or the logic "1" and the corresponding pilot tone. It should be stressed that actually it is immaterial whether pilot tones are generated at both logic "0" and logic "1", provided it is a pilot tone reference corresponding to the one of the above-mentioned algorithms which has not been selected.

The amplitude regulation of the modulation signal thus gives an improved extinction ratio, i.e. the ratio of logic "1" (p1) to logic "0" (p0) is increased, and the resulting signal/noise ratio in a complete application may therefore be increased. It should be noted in this connection that this improved extinction ratio is achieved, even though the amplitude regulation provides an asymmetric modulation of the transmission characteristic, as one extreme of the amplitude is adjusted to the ideal logic "1" or logic "0", respectively, without the opposite logic level being optimized.

Usually, it is preferred to regulate to logic "0", and thus according to the algorithm $\Delta V_{amp} \sim F_L \cdot k_1$. As appears from the above-mentioned algorithm, the regulation is proportional to k and F, which likewise means that a special case may be that ~ is replaced by =.

The driver signal, in response to the pilot tone signal fed to the modulation signal, is regulated to the logic "0" or logic "1" of the modulation signal in accordance with either $$\Delta V_{amp} \sim F_L \cdot k_1 |A_L| \text{ or}$$

$$\Delta_{amp} \sim F_H \cdot k_2 |A_H|$$

where $|A_L|$ or $|A_H|$ is the numeric amplitude of the pilot tone components detected in the feedback circuit at logic "0" and logic "1", respectively, it is additionally made possible to weight the regulation algorithm according to the actual distance from the modulation point to the desired optimum modulation point corresponding to either logic "1" or logic "0". This may be an advantage e.g. when starting the system at modulation amplitude zero, as the algorithm tracks the desired modulation point more rapidly.

The photoelectrical converter circuit is connected to and generates a feedback signal for a feedback circuit which is also connected to the pilot tone generator, said feedback circuit being adapted, in response to the pilot tone signal fed from the pilot tone generator and the feedback signal fed from the photoelectrical converter circuit, to generate bias control signals for the bias circuit and driver control signals for the driver circuit to regulate the bias signal and driver signal fed to the Mach-Zehnder modulator, it is possible to perform a combined regulation of a modulator circuit by means of both regulation of the system bias (or DC operating point) and the modulation amplitude.

It is noted that it is not decisive according to the invention how the modulation signals, formed by the driver signal, the bias signal and the pilot tone, are fed to the Mach-Zehnder modulator. The bias signal may e.g. be mixed electrically with the driver signal before the driver signal is fed to the electrodes of the Mach-Zehnder modulator, and the bias signal, the driver signal and optionally the pilot tone may be fed to separate electrodes or sets of electrodes in the Mach-Zehnder modulator, if desired.

The pilot tone signal is fed with the same amplitude to the logic "0" and logic "1" of the modulation signal, but with opposite phase, it is ensured that the complete system may be dimensioned very uniformly.

However, it should be noted that according to the teaching of the invention, in contrast to known regulation techniques, it is not decisive whether the two pilot tones used have the same phase, frequency, curve shape or amplitude, which may be extremely advantageous in several connections, since it is just necessary to have a pilot tone reference with which the pilot tone component or components fed back are compared.

The feedback circuit detects the pilot tone content of the feedback signal for the logic "1" level and the logic "0" level, respectively, and determines the phase between said pilot tone content and the pilot tone or tones generated by the pilot tone generator for both the logic "1" level and the logic "0" level, it is possible to obtain a simple and optimum modulation of the transmission characteristic of the Mach-Zehnder modulator with simultaneous regulation of modulation amplitude and bias. Detection at both the logic "0" level and the logic "1" level thus ensures continuous retention or regulation in accordance with the ideal or almost ideal modulation levels, said phase additionally giving clear information as to whether modulation is performed on increasing or decreasing half-periods of the transmission characteristic.

The feedback circuit generates a bias control signal for the bias circuit and a driver control signal for the driver circuit to achieve a state of equilibrium in which the phase between said pilot tone content and the pilot tone or tones generated by the pilot tone generator for both the logic "1" level and the logic "0" level is the same, a simple regulation application is achieved, it being possible beforehand to specify in the regulation algorithm whether phase-locked modulation on the increasing or decreasing half-periods of the transmission characteristic is desired.

It will be appreciated that said regulation algorithm may be supplemented with additional regulation parameters or strategies, it being possible e.g. to introduce a compensation particularly for the bias drift over time. Thus, according to certain guidelines, it may thus be decided to reduce the bias voltage by jumping one period or half a period down the V axis of the transmission characteristic.

Further, situations may occur in which it would be advantageous to change the sign of the bias voltage according to e.g. a mean value consideration of modulation data over a period of time.

The feedback circuit generates a bias control signal for the bias circuit and a driver control signal for the driver circuit to maintain a phase between said pilot tone content and the pilot tone or tones generated by the pilot tone generator for both the logic "1" level and logic "0" level with the same sign, a very simple and clear application is achieved, as the feedback signal as logic "0" and logic "1" is specifically used for regulating the driver circuit or the bias circuit, respectively, or vice versa.

Thus, it is noted that the ratio of the phase of the pilot tone component from the pilot tone generator to the phase of the corresponding, detected pilot tone component may have an opposite sign, if this applies to the pilot tone components at logic high as well as logic low. This means that the bias signal puts a DC operating point on the decreasing part of the transmission characteristic.

The decisive point according to the invention is thus to ensure that at logic high and at logic low, respectively, the pilot tone component has the same sign with respect to the added pilot tone, depending on whether the regulation is performed and a function of logic low or logic high. Thus, the regulation of the transient exclusively depends on the selected regulation parameter or parameters.

The bias control signal is provided with a rapid time constant and the drive control signal with a slow time constant, or vice versa, a practical regulation algorithm is achieved, capable of hooking on to an optimum or stable state in a predictable manner.

The bias control signal and the driver control signal are provided sequentially, an alternative embodiment of the invention is achieved, likewise capable of reproducibly hooking on to an optimum and stable state.

The amplitude of the pilot tone content in the feedback signal for the logic high level and the logic low level as well as the associated phase ratio of the corresponding pilot tones regulates the bias circuit and the driver circuit or the driver circuit and the bias circuit, respectively, in accordance with the regulation algorithms $$\Delta V_{bias} \sim F_L \cdot k_1 \cdot |A_L|$$

$$\Delta_{amp} \sim F_H \cdot k_2 \cdot |A_H|$$

where $\Delta V_{bias}$ is the change in the bias voltage provided by the regulation, $\Delta V_{amp}$ is the change in the driver signal provided by the regulation $k_1$ and $k_2$ are a suitably selected constant for the algorithm, and $F_L$ and $F_H$ assume the value +1 when the pilot tone component at logic "0" and logic "1", respectively, is in in-phase with the corresponding pilot tone generated by the pilot tone generator, and $F_L$ and $F_H$ assume the value −1 when the pilot tone component at logic "0" and the logic "1", respectively, is in antiphase with the corresponding pilot tone generated by the pilot tone generator, and $|A_L|$ and $|A_H|$ are the numeric amplitudes of the pilot tone components detected in the feedback circuit at logic "0" and logic "1", respectively, a compact and efficient regulation of the modulator circuit is achieved.

It is noted that a special case in accordance with the regulation algorithm is that $|A_L|$ and $|A_H|$ are set at 1, which means in practice that the amplitudes are not included in the algorithms.

A further special case is that "~" is replaced by "=", which makes the algorithm extremely simple and efficient.

All the last-mentioned algorithms are surprisingly simple, as the determined reference point of logic "0" and logic "1", respectively, individually controls bias and amplitude, respectively.

The amplitude of the pilot tone content of the feedback signal for the logic high level and the logic low level as well as the associated phase ratio of the corresponding pilot tones regulates the bias circuit and the driver circuit or the driver circuit and the bias circuit, respectively, in accordance with the regulation algorithms $$\Delta V_{AMP} \sim F_L \cdot k_1 \cdot |A_L|$$

$$\Delta_{bias} \sim F_H \cdot k_2 \cdot |A_H|$$

where $\Delta V_{bias}$ is the change in the bias voltage provided by the regulation $\Delta V_{amp}$ is the change in the driver signal provided by the regulation, $k_1$ and $k_2$ are a suitably selected constant for the algorithm, $F_L$ and $F_H$ assume the value +1 when the pilot tone component at logic "0" and logic "1", respectively, is in-phase with the corresponding pilot tone generated by the pilot tone generator, and $F_L$ and $F_H$ assume the value −1 when the pilot tone component at logic "0" and logic "1", respectively are in antiphase with the corresponding pilot tone generated by the pilot tone generator, and $|A_L|$ and $|A_H|$ are the numeric amplitudes of the pilot tone components detected in the feedback circuit at logic "0" and logic "1", respectively, a corresponding simple algorithm is achieved, as, in this case, the amplitude regulation is locked directly to logic "0" and the bias is locked directly to logic "1".

The photoelectrical converter circuit is connected to a feedback circuit which is also connected to the pilot tone generator, said feedback circuit being adapted to generate driver control signals for the driver circuit connected therewith in response to detected pilot tone components in the feedback signal, an implementation of the above-mentioned method is achieved for a modulator circuit with amplitude regulation.

The photoelectrical converter circuit is connected to a feedback circuit which is also connected to the pilot tone generator, said feedback circuit being adapted to generate bias control signals for the bias circuit connected therewith and driver control signals for the driver circuit connected therewith in response to detected pilot tone components in the feedback signal, an implementation of the above-mentioned method is achieved for a modulator circuit with combined bias and amplitude regulation.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which.

DETAILED DESCRIPTION OF THE INVENTION

Figure 1:
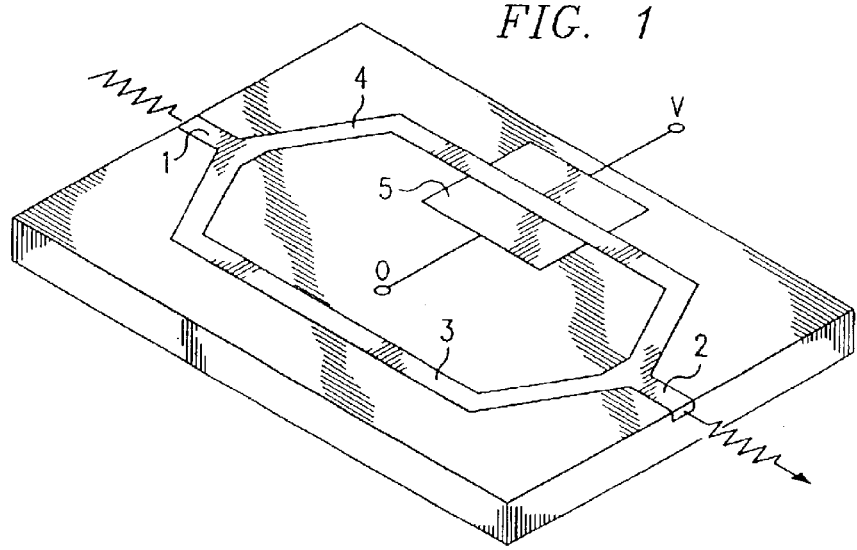
FIG. 1 shows an explanatory sketch of a simple Mach-Zehnder modulator.

FIG. 1 shows an explanatory sketch of a simple Mach-Zehnder modulator. The light may be modulated in a Mach-Zehnder transmitter by suitable mixing of two light signals with a certain mutual phase shift, said modulator having an input end 1 and an output end 2.

The input end 1 of the modulator is split into two optical branches 3 and 4 and are joined again for the optical output end 2 of the modulator.

In the example shown, a constant light source (not shown) can thus feed light to the input end 1 and then emit modulated light at the output end 2.

A pair of electrodes 5 is connected to one optical branch 4 so that a signal applied to the electrode 5 causes application of a corresponding electrical field on the optical branch 4, which in turn results in changed optical transmission properties on the branch 4 with respect to the propagation velocity of the light.

In the case shown, the mutual phase shift is achieved by splitting light from a light source in two optical conductors 3 and 4, an electrical field being applied to one optical conductor 4 by means of an electrode 5. This electrical field gives rise to a phase delay on the optical branch 4 in dependence on the electrical field applied, and then the resulting light output is modulated in dependence on the mutual phase ratio of the light in the two optical branches 3 and 4 on the output 2 of the modulator.

Thus, a laser source may be modulated, as needed, on the optical output by regulating the mutual phase shift between the two optical branches 3 and 4.

A Mach-Zehnder modulator is a well-known component.

The electrodes may be configured in several different ways. For example, separate pairs of electrodes may be used on each optical branch 3 and 4.

Figure 2:
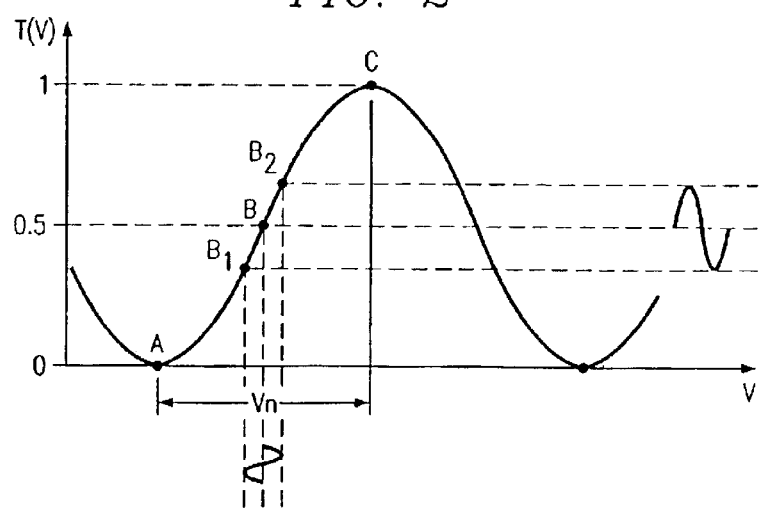
FIG. 2 shows the transmission characteristic of a Mach-Zehnder modulator.

FIG. 2 shows the transmission characteristic for a given ideal Mach-Zehnder modulator, where the V axis indicates the applied electrode voltage, while T(V) indicates the applied electrode voltage, while T(V) indicates the transmission characteristic of the Mach-Zehnder modulator as function of the applied electrode voltage V.

The ideal output of the Mach-Zehnder modulator of the type concerned is given by the transmission characteristic $$T(V) = \cos^2(\phi_0/2 - \pi V/2 V)_\pi$$

where $\phi_0$ is a constant depending on the difference in distance between the optical branches 3, 4, $V_\pi$ is a material-dependent constant, and V is the applied electrode voltage. As appears from FIG. 2, this transmission characteristic is periodic. Transmission of light may thus be modulated dynamically in response to the applied electrode voltage. As illustrated by the curve, a DC signal Vd gives rise to an operating point B on the transmission characteristic. A superimposed AC voltage on the electrode, which operates between V1 and V2, is thus included in the transmission characteristic in the points B1 and B2.

In connection with modulation of data signals between high and low intensity levels it is desirable owing to the signal/noise ratio that the distance between the upper and lower points B1 and B is as great as possible, thereby providing the greatest possible modulation of the complete system. It will also be seen from FIG. 2 that, ideally, the operating point should be located at T(V)=½, and that the amplitude of the AC component of the electrode signal should be in the vicinity of Vπ, so that B1 and B2 should be modulated as close as possible on A and C, respectively.

However, a practical problem in this connection is that the transmission characteristic drifts because of the temperature conditions and the structure of the electrodes. This means that the operating point, if no countermeasures are taken, drifts away from the point B, causing the resulting output signal on the Mach-Zehnder modulator output to be distorted correspondingly.

In addition to the drift with respect to the synchronization of the operating point B, the ratio of the maximum of T(V) to the maximum of Vπ will likewise drift, causing the modulation of the AC component to be impaired.

Figure 3:
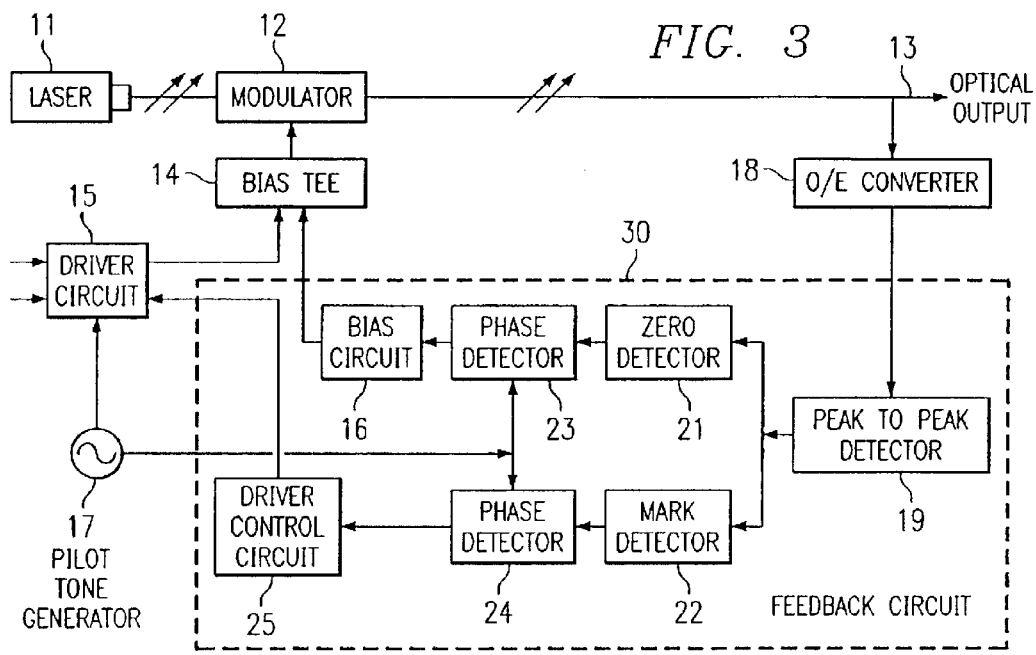
FIG. 3 shows an explanatory diagram of an embodiment of the invention.

FIG. 3 shows an explanatory diagram of an embodiment of the invention.

A DFB laser 11 is optically connected to a Mach-Zehnder modulator 12 which feeds an optical output 13.

With respect to the overall mode of operation, the shown modulator 12 corresponds in principle to the Mach-Zehnder modulator shown in FIG. 1, as, in this case, the modulator output 2 corresponds to the optical output 13.

The Mach-Zehnder modulator 12 receives an electrical driver signal for the electrodes from a so-called Bias TEE 14, which is in turn connected to a drive 15 and a bias control 16.

Thus, the Mach-Zehnder modulator 12 is controlled by the driver circuit 15 which emits a signal voltage in response to the applied data signal DATA.

The shown Bias TEE 14 serves to mix the DC operating point B on the transmission characteristic T(V) shown in FIG. 2 with an AC modulation signal Vπ. The operating point should be as close as possible to B, and any deviation from B should be up the curve toward B1 rather than down the curve owing the resulting signal/noise ratio. According to the invention, the modulation signal itself will be modulated such that, at the extremes, the super-imposed modulation is a close to A or C as possible.

The electrical data input signal is fed to the Bias TEE 14 from the driver 15, as mentioned above, in response to the modulated data signals, while the operating point is fed from the bias control 16.

The modulator circuit of the invention additionally comprises a pilot tone generator 17 electrically connected to the driver 15 so that the driver signal generated by the data signal is superimposed by a pilot tone.

The typical ratio of the driver signal frequency to the pilot tone frequency is that the driver signal has a high frequency, while the pilot tone has a relatively low frequency. However, it should be stress that according to the invention it is not decisive that the driver signal has a higher frequency than the pilot tone. The decisive point is that there is a certain numeric difference between driver signal and pilot tone.

The basic modulation of the driver signal is 2.5 Gbits/s and that of the pilot tone is 1.8 kHz according to the present embodiment. Other modulation and pilot tone frequencies may be selected.

The amplitude of the pilot tone signal should be relatively low with respect to the driver signal.

The transmission system of the invention is additionally provided with a feedback circuit 30 which is fed back to the bias control 16 and the driver 15 from the optical output 13 of the Mach-Zehnder modulator.

Part of the optical output signal from the Mach-Zehnder modulator is thus branched to an O/E converter 18 which generates an electrical feedback signal in response to the branched optical feedback signal.

The electrical feedback signal is fed further on to a peak-peak detector 19, which is electrically connected to two detectors, a zero detector 21 and a mark detector 22, respectively.

Each of the detectors 21 and 22 is moreover electrically connected to the input of a phase detector 23 and the input of a phase detector 24, respectively. In practice, the phase detectors 23 and 24 will be formed by a sample-and-hold circuit.

The outputs of the phase detectors 23 and 24 are fed to the bias control 16 and a driver control circuit 25, respectively.

The peak-peak detector 19, the zero detector 21, the mark detector 22, and the phase detectors 23 and 24, the bias control 16 and the driver control circuit 25 together form the feedback circuit 30 shown in dashed line.

The inputs of the phase detectors 23 and 24 are also electrically connected to the pilot tone generator 17.

The peak-peak detector 19 serves to currently detect the electrical minimum and the electrical maximum, which are subsequently fed to the zero detector 21 and the mark detector 22, respectively. The two output signals from the peak-peak detector 19 will thus form the envelopes of the signals representing a logic low and the signals representing a logic high, respectively.

These two envelopes represent the pilot tone components at the points B1 and B2 in the transmission characteristic shown in FIG. 2.

In practice, the peak-peak detector 19 is dimensioned to provide a sufficient number of peak detections to give a satisfactory quality of the resulting envelopes.

In principle, in the resulting signal on the transmission characteristic, the envelopes will independently approach zero for the logic low envelope when B1 moves toward A, and approach zero for the logic high envelope when B2 approaches the point C.

It is noted for explanatory reasons that the envelopes are not necessarily of the same numeric size, if the bias point drifts.

If, because of overload and/or drift of the working point, the signal Vπ gets beyond the minimum A of the transmission characteristic, it is noted that the pilot tone signal generated by the pilot tone generator 17 and the resulting pilot tone signal registered by the zero detector will be in antiphase. The same applies to overload beyond the maximum C of the transmission characteristic.

Subsequently, the phase detectors 23 and 24, controlled by the pilot tone generator 17, will register the amplitude of the envelopes of the zero detector 21 and the mark detector 22, respectively, and register the phases of these. This may be done in practice e.g. in that the maximum and the minimum of the pilot tone trigger sampling on the envelopes.

As stated above, the outputs of the phase detectors 23 and 24 are fed further on to the bias control 16 and a driver control circuit 25, respectively.

The driver control circuit 25 is moreover electrically connected to the driver 15, and bias circuit 16 is electrically connected to the Bias TEE 14.

The driver control circuit 25 will thus regulate the modulation level, i.e. the AC amplitude of the control voltage V which is fed to the driver 15 and thereby to the Mach Zehnder modulator 12.

Thus, via the Bias TEE 14, the bias control 16 regulates the introduction of bias, i.e. the DC operating point, on the Mach-Zehnder modulator 12.

The mode of operation of the above-mentioned modulator will be elaborated below with reference to FIG. 4 and FIG. 5.

Figure 4:
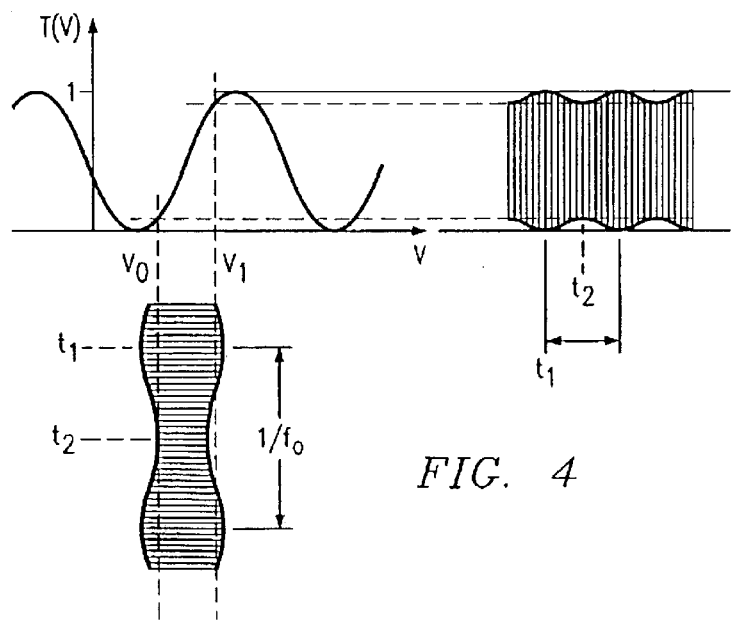
FIG. 4 shows the envelope of the superimposed pilot tone.

FIG. 4 shows the fundament development of an ideal modulation of a Mach-Zehnder modulator according to the invention, where the T axis indicates the transmission characteristic or optical output as a function of the modulation voltage v on the V axis.

It will thus be see(?) that the modulation voltage to logic zero is V0, and the modulation voltage to logic high is V1.

The modulation of the driver signal between V0 and V1 will proceed with a relatively high frequency, and accordingly just the envelope of the modulation signal will be considered for this purpose.

In the case shown, logic high V1 and logic low V0 are both superimposed by a pilot tone. The cycle time of the pilot tone is 1/f0, where f0 indicates the frequency of the pilot tone. For explanatory reasons, the pilot tones are shown with considerably high amplitudes than those occurring in practice.

As will be seen, the superimposed pilot tones of logic low and logic high, respectively, on the V axis are the same in this case, but with opposite phase.

At the time t1, the superimposed pilot tone on logic low thus has a minimum, while the pilot tone, likewise at the time t1, has a minimum with respect to the V axis.

It also appears from the figure that the pilot tones superimposed on the modulation voltage give rise to superimposed low-frequency pilot tones in the resulting light, it being noted that the resulting isolated pilot tones have the same phase as the applied pilot voltage. A minimum of the pilot tone superimposed on logic zero at the time t1 on the V axis causes a minimum in the transmission characteristic or the optical output at the time t1. Correspondingly, the shown maximum of the pilot tone superimposed on logic 1 at the time t1 on the V axis gives a maximum in the transmission characteristic or the optical output at the time t1.

In the shown example, both the superimposed pilot tones on the V axis thus oscillate in the same phase as the resulting pilot tone light.

Figure 5:
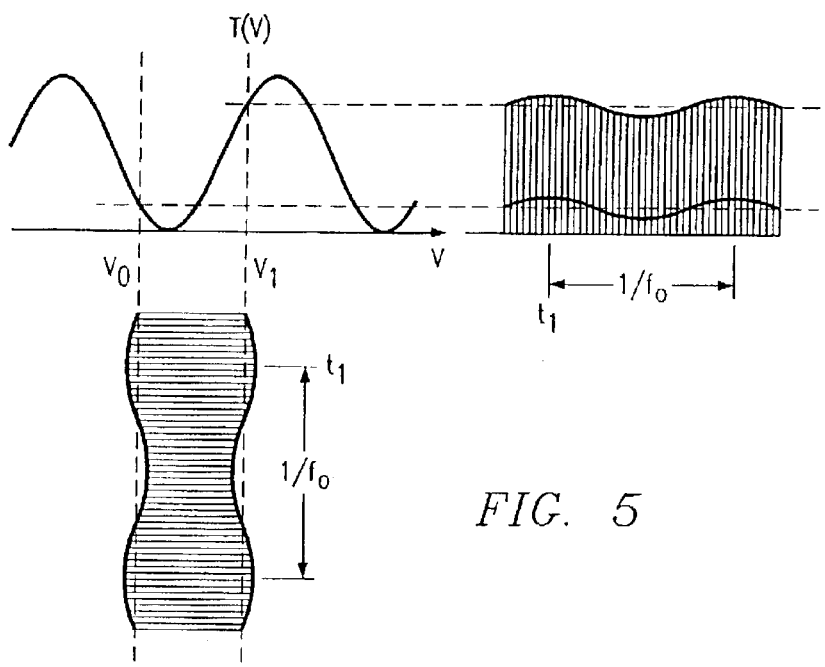
FIG. 5 shows the envelope of the superimposed pilot tone in case of shift on bias.

FIG. 5 illustrates how the invention handles a beginning error state in the form of drift of the operating point.

It should be stressed that the shown conditions between pilot tones and modulation signals are not to scale. It should moreover be stressed that the occurred error state is not to scale either, as shown error situation is corrected currently.

It will thus be seen from FIG. 5 that the pilot tones, still superimposed on logic "0" and logic "1", respectively, with opposite sign, now give rise to changed pilot tone components in the output signal.

In the case shown, as a consequence of a drift the bias voltage is thus no longer correct, and the modulation of the electrodes on the Mach-Zehnder modulator (not shown) on the V axis therefore does not give an optimum modulation in accordance with the transmission characteristic T(V).

The level of the emitted light at logic high has thus decreased, and the level of the optical signal at logic low has increased, which causes i.e. an impaired signal/noise ratio of the modulated light on the output of the Mach-Zehnder modulator.

The drift of the modulator, specifically the electrodes of the modulator, means that the pilot tone component for logic high still oscillates in phase with the corresponding pilot tone on the output of the modulator, it being also seen that the pilot tone superimposed on logic low now oscillates in the opposite phase to the corresponding pilot tone on the output.

Thus, at the time t1, the pilot tones on the output signal both have a maximum.

In addition, the amplitude of the superimposed pilot tones in the output signal has increased (which is not readily apparent from the drawings). The reason why the amplitude increases is that the inclination of the T(V) characteristic increases toward its maximum when the modulation voltage changes from the maxima and minima of T(V).

According to the invention, the modulation circuit shown in FIG. 3 will detect that the phase has changed between the modulation signal on the in put and output of the modulator for logic low, just as the modulation circuit will detect an increasing amplitude independently for the pilot tone at logic low and logic high.

If the shown drift of the operating point had likewise been superimposed by a drift on the amplitude ratio of V to T(V) and thus had given rise to an asymmetric drift, the feedback circuit would likewise independently have detected the two (and different) amplitudes for logic high and logic low, respectively.

Subsequently, the feedback signal will provide control signals for the bias circuit 16 and the driver circuit 15 whereby the operating point on the V axis, i.e. the bias voltage, is adjusted to achieve a symmetric modulation of voltage, is adjusted to achieve a symmetric modulation of T(V), following which the amplitude of the driver signal applied to the Mach-Zehnder modulator 12 is as low as possible at both logic high and logic low, so that the transmission characteristic T(V) is modulated optimally.

Conversely, the feedback circuit may initially regulate the driver circuit 15 and thereby the amplitude of the modulation signal on the V axis to achieve uniform amplitudes at logic high as well as at logic low while maintaining opposite phase, and then the operating point is adjusted until the phases of the pilot tone signals on the output again correspond to the phases on the pilot tones, as shown in FIG. 4.

However, it should be noted that depending on the selected regulation algorithm it may also be decided to adjust the bias so that, after the regulation, the operating point is present on the downwardly extending part of the transmission characteristic, for which reason, according to the invention, the pilot tone components on the output may be in opposite phase to the corresponding applied pilot tones on condition that both pilot tones components are in opposite phase.

In practice, the bias circuit 16 as well as the driver circuit may be regulated at the same time with different time constants on the feedback control signals.

Figure 6:
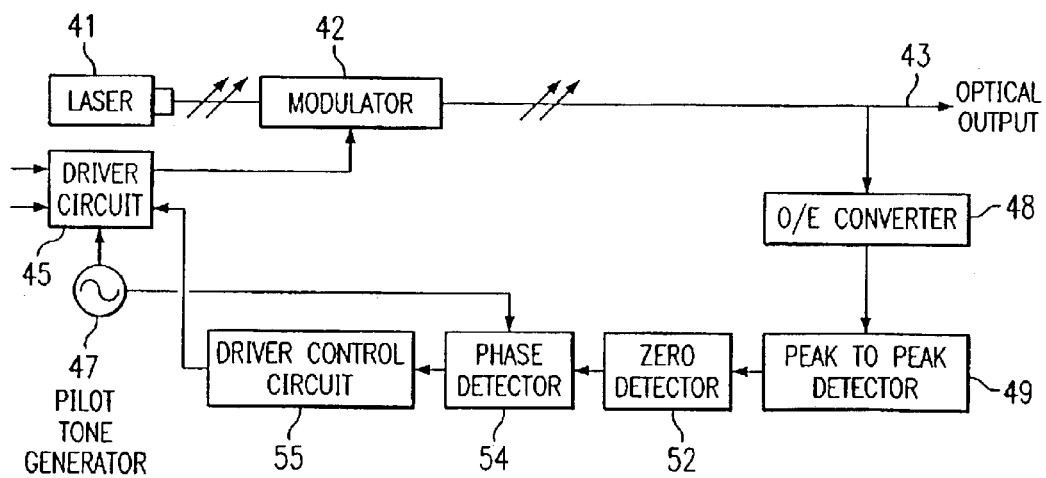
FIG. 6 illustrates the mode of operation of the circuit shown in FIG. 5.

FIG. 6 shows an explanatory diagram of a further embodiment of the invention.

A DFB laser 41 is optically connected to a Mach-Zehnder modulator 42, which feeds an optical output 43.

With respect to the overall mode of operation, the shown modulator 42 corresponds in principle to the Mach-Zehnder modulator of FIG. 1, but, according to the present embodiment, the modulator is of the bias-free type. Thus, no bias voltage is to be fed to the modulator 42, which thus has a minimum drift with respect to the zero crossing of the transmission characteristic.

The Mach-Zehnder modulator 42 receives an electrical driver signal for the electrodes from the driver 45.

The Mach-Zehnder modulator 42 is thus controlled by the driver circuit 45, which emits a signal voltage in response to the applied data signal DATA.

The modulation circuit additionally comprises a pilot tone generator 47 which is electrically connected to the driver 45 so that the driver signal generated by the date signal is superimposed by a pilot tone.

According to this embodiment, the pilot tone will exclusively be modulated on the logic 0's of the modulator.

The transmission system of the invention is additionally provided with a feedback which is fed back to the driver 45 from the optical output 43 of the Mach-Zehnder modulator.

Part of the optical output signal from the Mach-Zehnder modulator is thus branched to an O/E converter 48 which generates an electrical feedback signal in response to the branched optical feedback signal.

The electrical feedback signal is fed further on to a peak-peak detector 49 which is moreover electrically connected to a zero detector 52.

The detector 52 is moreover electrically connected to the input of a phase detector 54. In practice, the phase detector 54 will be formed by a sample-and-hold circuit.

The input of the phase detector 54 is likewise electrically coupled to the pilot tone generator 47.

The peak-peak detector 49 serves to currently detect the electrical minimum and the electrical maximum which are subsequently fed to the zero detector 52. Output signals from the peak-peak detector 49 will thus form the envelopes for the signals which represent a logic low.

In this embodiment, too, the peak-peak detector 49 is detected such that a sufficient number of peak detections are achieved to give a satisfactory quality of the resulting envelopes.

In the resulting signal of the transmission characteristic, the envelopes will, in principle independently, approach zero for the logic low envelope curve when B1 moves toward A, and approach zero for the logic high envelope when B2 approaches the point C.

Subsequently, the phase detector 54, controlled by the pilot tone generator 47, will register the phase of the envelopes from the zero detector 52. This may be done in practice e.g. in the maximum and the minimum of the pilot tone trigger sampling on the envelopes.

The output of the phase detector 54 is fed further on to a driver control circuit 55.

The driver control circuit 55 is moreover electrically connected to the driver 45.

The driver control circuit 55 will thus regulate the modulation level, i.e. the AC amplitude of the control voltage V which is fed to the driver 45 and thereby to the Mach-Zehnder modulator 42.

In this case, the driver control circuit 55 provides a change in the amplitude gain $\Delta V_{amp}$ in accordance with the algorithm $$\Delta V_{amp} = F_L \cdot k_1$$

where $k_1$ is a suitably selected constant for the algorithm, and $F_L$ assumes the value +1 when the pilot tone component at logic "0" is in in-phase with the corresponding pilot tone generated by the pilot tone generator, and $F_L$ assumes the value −1 when the pilot tone component at logic "0" is in antiphase with the corresponding pilot tone generated by the pilot tone generator.

The algorithm may optionally be modified to $$\Delta V_{amp} = F_L \cdot k_1 |A_L|$$

where the amplitude $|A_L|$ of the pilot tone component registered in the feedback signal provides a regulation which is additionally dependent on the actual distance of the logic "0" from the ideal zero of the transmission characteristic, where $|A_L|$ ideally assume the value 0.

A further modification of the above-mentioned circuit may e.g. be to feed the pilot tone directly to a separate pilot tone electrode set in the Mach-Zehnder modulator.

Thus, according to the algorithm shown above, the resulting amplitude regulation of the modulation signal, i.e. the driver signal, is locked to the ideal logic zero on the transmission characteristic.

Finally it should be noted that it is not decisive according to the invention whether the regulation functions are performed exactly in the stated and well-defined circuits, as it is the overall functionality of the circuits which provides the invention.

Although the present invention has been described in connection with specific exemplary embodiments, it should be understood that various changes, substitutions, and alterations can be made to the disclosed embodiments without departing from the spirit and scope of the invention as set forth in the appended claims.

What is claimed is:

1. An apparatus for modulating light, comprising:
   a bias free modulator operable to receive an optical input signal, the modulator operable to generate an optical output signal from the optical input signal;
   a pilot tone generator operable to generate a pilot tone signal;
   a driver circuit operable to receive a data signal, the driver circuit operable to generate a driver signal in response to the data signal and the pilot tone signal, the driver circuit operable to control the modulator;
   a feedback circuit operable to generate a feedback signal in response to the optical output signal, the feedback signal operable to regulate the driver signal generated by the driver circuit.

2. The apparatus of claim 1, wherein the feedback circuit includes a driver control circuit operable to regulate a modulation level of a control voltage provided to the driver circuit.

3. The apparatus of claim 2, wherein the feedback signal includes a pilot tone signal component operable to provide regulation which is dependent on a distance of a logic zero state from an ideal zero of a transmission characteristic of the optical output signal.

4. The apparatus of claim 3, wherein the feedback circuit determines a phase difference between the content of the pilot tone signal in the optical output signal and the pilot tone signal generated by the pilot tone generator.

5. The apparatus of claim 1, wherein the feedback circuit is operable to receive the pilot tone signal for use in generating the feedback signal.

6. The apparatus of claim 1, wherein the pilot tone signal is modulated on low and high level logic states of the optical output signal.

7. The apparatus of claim 1, wherein the pilot tone signal is modulated on high level logic states of the optical output signal.

8. The apparatus of claim 7, wherein the feedback circuit detects a content of the pilot tone signal at the low level logic state of the optical output signal.

9. The apparatus of claim 1, wherein the pilot tone signal is modulated on low level logic states of the optical output signal.

10. The apparatus of claim 9, wherein the feedback circuit detects a content of the pilot tone signal at the low level logic state of the optical output signal.

11. A method for modulating light, comprising:

receiving an optical input signal;

modulating the optical input signal without bias;

generating an optical output signal from the modulated optical input signal;

receiving a data signal;

receiving a pilot tone signal;

generating a driver signal in response to the data signal and the pilot tone signal, the driver signal being used to modulate the optical input signal;

generating a feedback signal in response to the optical output signal;

controlling the driver signal in response to the feedback signal.

12. The method of claim 11, further comprising:

regulating an amplitude of the optical output signal in response to the driver signal.

13. The method of claim 11, further comprising:

controlling generation of the feedback signal in response to the pilot tone signal.

14. The method of claim 11, further comprising:

determining a content of the pilot tone signal in the optical output signal.

15. The method of claim 14, further comprising:

determining a phase difference in the content of the pilot tone signal in the optical output signal and the pilot tone signal.

16. A system for modulating light, comprising:

means for receiving an optical input signal;

means for modulating the optical input signal without bias;

means for generating an optical output signal from the modulated optical input signal;

means for receiving a data signal;

means for generating a pilot tone signal;

means for generating a driver signal in response to the data signal and the pilot tone signal;

means for controlling generation of the optical output signal in response to the driver signal;

means for generating a feedback signal in response to the optical output signal;

means for controlling generation of the driver signal in response to the feedback signal.

17. The system of claim 16, further comprising:

means for regulating an amplitude of the optical output signal in response to temperature fluctuations.

18. The system of claim 16, further comprising:

means for determining a content of the pilot tone signal in the optical output signal.

19. The system of claim 18, further comprising:

means for determining a phase difference between the content of the pilot tone signal in the optical output signal and the pilot tone signal.

20. The system of claim 16, further comprising:

means for applying a DC voltage to modulation of the optical input signal;

means for adjusting the optical output signal to compensate for drift inserted by the DC voltage.

* * * * *